(12) United States Patent
Riniker et al.

(10) Patent No.: US 7,441,620 B2
(45) Date of Patent: Oct. 28, 2008

(54) RADIATOR AND ISOLATION AND MOUNT SYSTEM

(75) Inventors: Martin J. Riniker, Franklin, WI (US); Craig D. Endres, Oak Creek, WI (US); Gregg D. Olson, Racine, WI (US); James R. Prochniak, Racine, WI (US); Robert J. DeGroot, Milwaukee, WI (US)

(73) Assignee: Modine Manufacturing Company, Racine, WI (US)

( * ) Notice: Subject to any disclaimer, the term of this patent is extended or adjusted under 35 U.S.C. 154(b) by 129 days.

(21) Appl. No.: 11/439,826

(22) Filed: May 23, 2006

(65) Prior Publication Data
US 2007/0272460 A1 Nov. 29, 2007

(51) Int. Cl.
*B60K 11/04* (2006.01)
*F28F 9/04* (2006.01)

(52) U.S. Cl. .............. 180/68.4; 180/68.6; 165/906; 165/178; 165/69

(58) Field of Classification Search ............. 180/68.4, 180/68.6; 165/69, 178, 906, 149
See application file for complete search history.

(56) References Cited
U.S. PATENT DOCUMENTS

| | | | |
|---|---|---|---|
| 1,374,394 A * | 4/1921 | Ross ...................... | 180/68.4 |
| 4,540,044 A | 9/1985 | Lenz | |
| 5,228,511 A | 7/1993 | Boquel et al. | |
| 6,199,622 B1 * | 3/2001 | Mashio et al. ............... | 165/67 |
| 6,513,579 B1 * | 2/2003 | Kent et al. ................... | 165/67 |
| 6,907,916 B2 * | 6/2005 | Koyama ..................... | 165/67 |
| 7,234,511 B1 * | 6/2007 | Lesage ........................ | 165/69 |
| 2006/0213640 A1 * | 9/2006 | Matsuoka et al. ........... | 165/67 |
| 2006/0213644 A1 * | 9/2006 | Kolb et al. ................... | 165/81 |

* cited by examiner

*Primary Examiner*—Christopher Ellis
*Assistant Examiner*—John R Olszewski
(74) *Attorney, Agent, or Firm*—Michael Best & Friedrich LLP

(57) ABSTRACT

A heat exchanger and mount isolation system (10) is provided and includes a heat exchanger (12) for a vehicular application, a pair of side frame members (14,16) for mounting the heat exchanger (12) to a vehicle, and four pairs (18) of isolation mount assemblies (19) for mounting the heat exchanger (12) to the side frame members (14,16). The mount assemblies (19) are received in mounting bores (30) that are integral parts of the heat exchanger (12). Each of the pair 18 of mount assemblies (19) is inserted into the opposite ends (32,34) of a corresponding one of the mount bores (30) and includes a pair of abutting metal sleeves (42) that are mounted in respective annular flanged isolators (40).

15 Claims, 3 Drawing Sheets

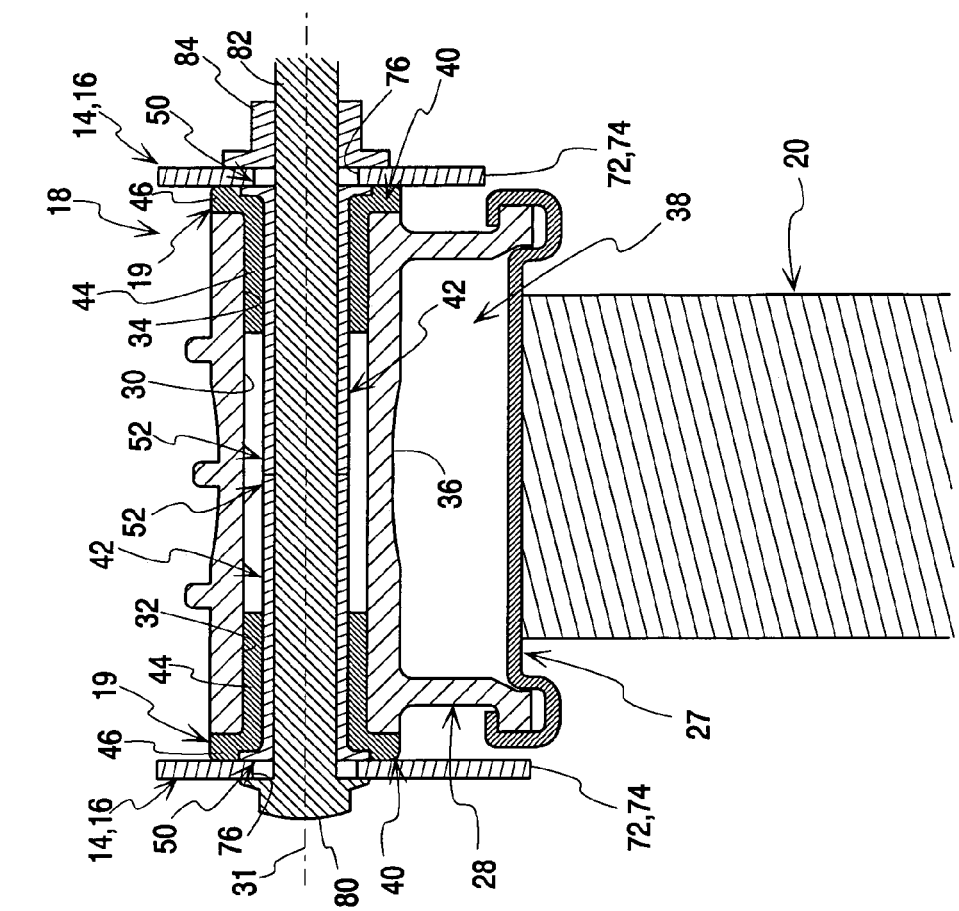
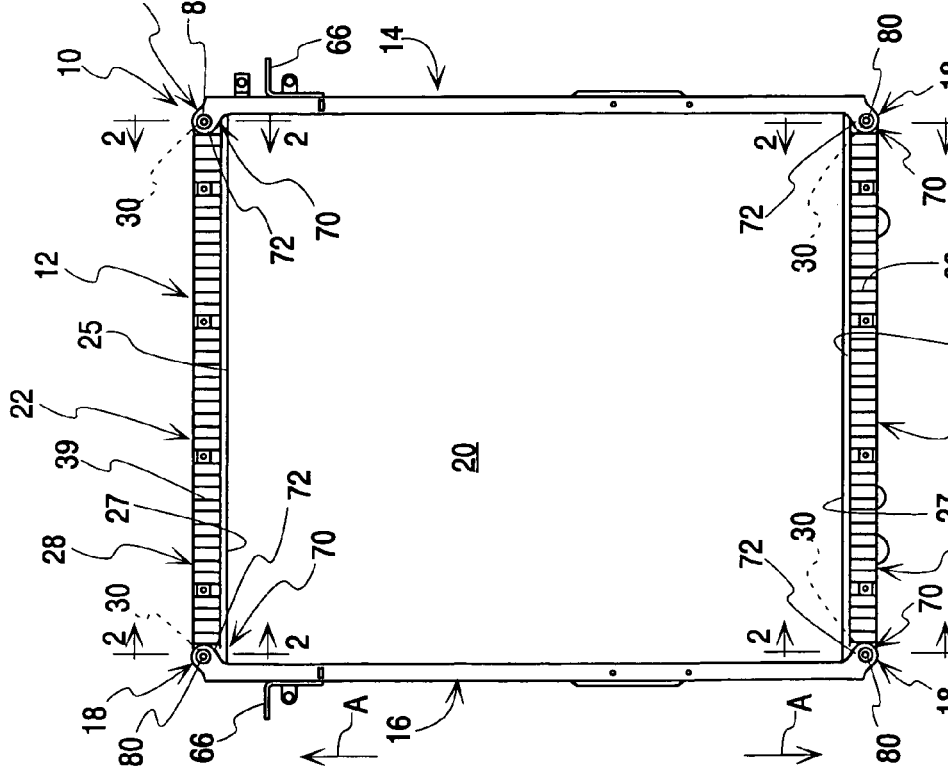

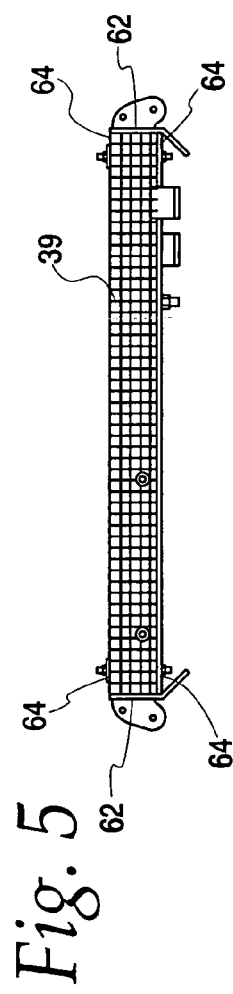
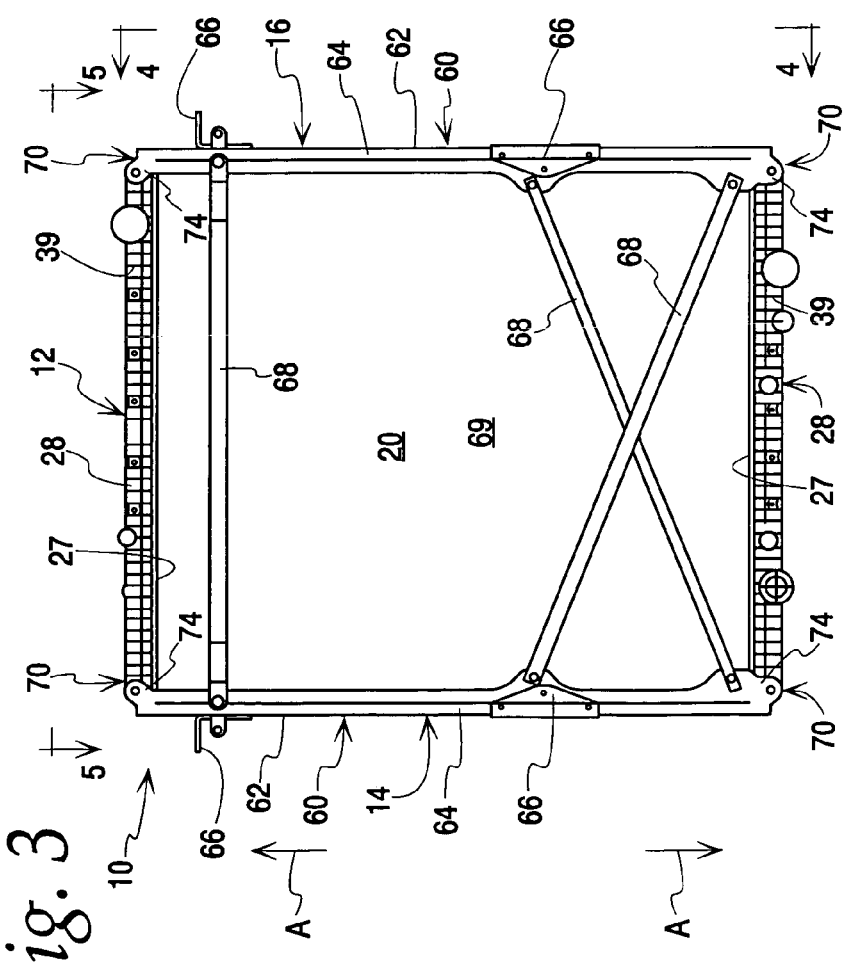
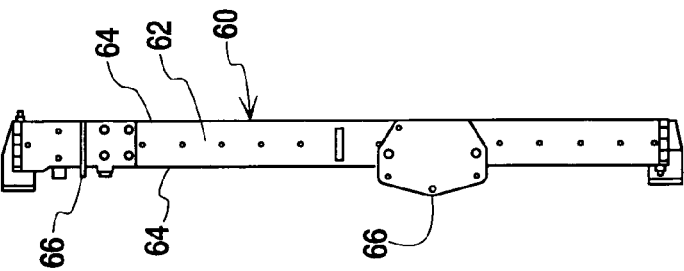

RADIATOR AND ISOLATION AND MOUNT SYSTEM

FIELD OF THE INVENTION

This invention relates to heat exchangers and structures for mounting heat exchangers in vehicular applications, and in more particular applications, to radiators and structures for mounting radiators in vehicular applications.

BACKGROUND OF THE INVENTION

Conventional mount structures for heat exchanges, such as radiators, include four sided frames that surround the periphery of a heat exchanger, with isolation mounts being provided on the frames for mounting the heat exchanger to a vehicle. While these designs work well for their intended purpose, there is always room for improvement, such as for example, in the areas of weight and cost.

SUMMARY OF THE INVENTION

In accordance with one feature of the invention, a heat exchanger and isolation mount system is provided and includes a heat exchanger, four pairs of isolating mount assemblies, a pair of side frame members, and four threaded fasteners. The heat exchanger includes a core and a pair of manifolds connected to opposites side of the core to direct a fluid to and from the core. Each of the manifolds has a pair of spaced mount bores, with each of the mount bores having opposite ends extending through the manifold. Each pair of the mount assemblies is inserted into the opposite ends of a corresponding one of the mount bores, with each of the mount assemblies including a resilient, annular flanged isolator and an annular flanged metal sleeve extending through the isolator. Each resilient, annular flanged isolator has an annular flange engaged against the corresponding manifold and a body inserted into one of the opposite ends of the corresponding mount bore. Each annular flanged metal sleeve has a flanged end engaged against the corresponding isolator and a terminal end extending from the isolator into the corresponding mount bore to abut the terminal end of the metal sleeve of the other mount assembly of the pair inserted into the other of the opposite ends of the corresponding mount bore. The pair of side frame members overlie opposite sides of the core, with each frame member extending between the pair of manifolds and having a pair of mount flanges sandwiching one of the pairs of mount assemblies in one of the manifolds and another pair of mount flanges sandwiching another one of the pairs of the mount assemblies in the other of the manifolds. Each of the fasteners extends through one of the pairs of mount flanges and through the corresponding pair of mount assemblies to clamp the corresponding pair of mount assemblies and the corresponding manifold between the pair of mount flanges with the mount flanges engaged against the flanged ends of the corresponding pair of mount assemblies.

In accordance with one feature of the invention, a heat exchanger and isolation mount system is provided and includes a heat exchanger, four pairs of isolating mount assemblies, a pair of side frame members, and four threaded fasteners. The heat exchanger includes a core and a pair of manifolds connected to opposites side of the core to direct a fluid to and from the core. Each of the manifolds includes a header plate and a tank having a pair of spaced mount bores, with each of the mount bores having opposite ends extending through the tank. Each pair of the mount assemblies is inserted into the opposite ends of a corresponding one of the mount bores, with each of the mount assemblies including a resilient, annular flanged isolator and an annular flanged metal sleeve extending through the isolator. Each resilient, annular flanged isolator has an annular flange engaged against the corresponding tank and a body inserted into one of the opposite ends of the corresponding mount bore. Each annular flanged metal sleeve has a flanged end engaged against the corresponding isolator and a terminal end extending from the isolator into the corresponding mount bore to abut the terminal end of the metal sleeve of the other mount assembly of the pair inserted into the other of the opposite ends of the corresponding mount bore. The pair of side frame members overlie opposite sides of the core, with each frame member extending between the pair of manifolds and having a pair of mount flanges sandwiching one of the pairs of mount assemblies in one of the tanks and another pair of mount flanges sandwiching another one of the pairs of the mount assemblies in the other of the tanks. Each of the fasteners extends through one of the pairs of mount flanges and through the corresponding pair of mount assemblies to clamp the corresponding pair of mount assemblies and the corresponding tank between the pair of mount flanges with the mount flanges engaged against the flanged ends of the corresponding pair of mount assemblies.

According to one feature, each of the side frame members includes an elongate channel having a base wall and a pair of side walls extending from the base wall. In a further feature, each of the mount flanges is part of a corresponding one of the side walls.

As one feature, each of the threaded fasteners includes a threaded bolt and a threaded nut.

According to one feature, the heat exchanger and isolation mount system further includes at least one cross brace extending between the side frame members and overlying a face of the core.

As one feature, each of the tanks is a molded non-metallic part. As a further feature, each of the mount bores is hydraulically isolated from fluid compartment of the tank.

Other objects, features, and advantages of the invention will become apparent from a review of the entire specification, including the appended claims and drawings.

BRIEF DESCRIPTION OF THE DRAWINGS

FIG. 1 is a front elevation of a heat exchanger and mount system embodying the present invention;

FIG. 2 is an enlarged section view taken from lines 2-2 in FIG. 1 and representative of the isolation mount structure at each of the four corners of the heat exchanger and mount system of FIG. 1;

FIG. 3 is a rear elevation of the heat exchanger of FIG. 1;

FIG. 4 is a view taken from lines 4-4 in FIG. 3;

FIG. 5 is a view taken from lines 5-5 in FIG. 3; and

DETAILED DESCRIPTION OF THE PREFERRED EMBODIMENTS

Figure 6:
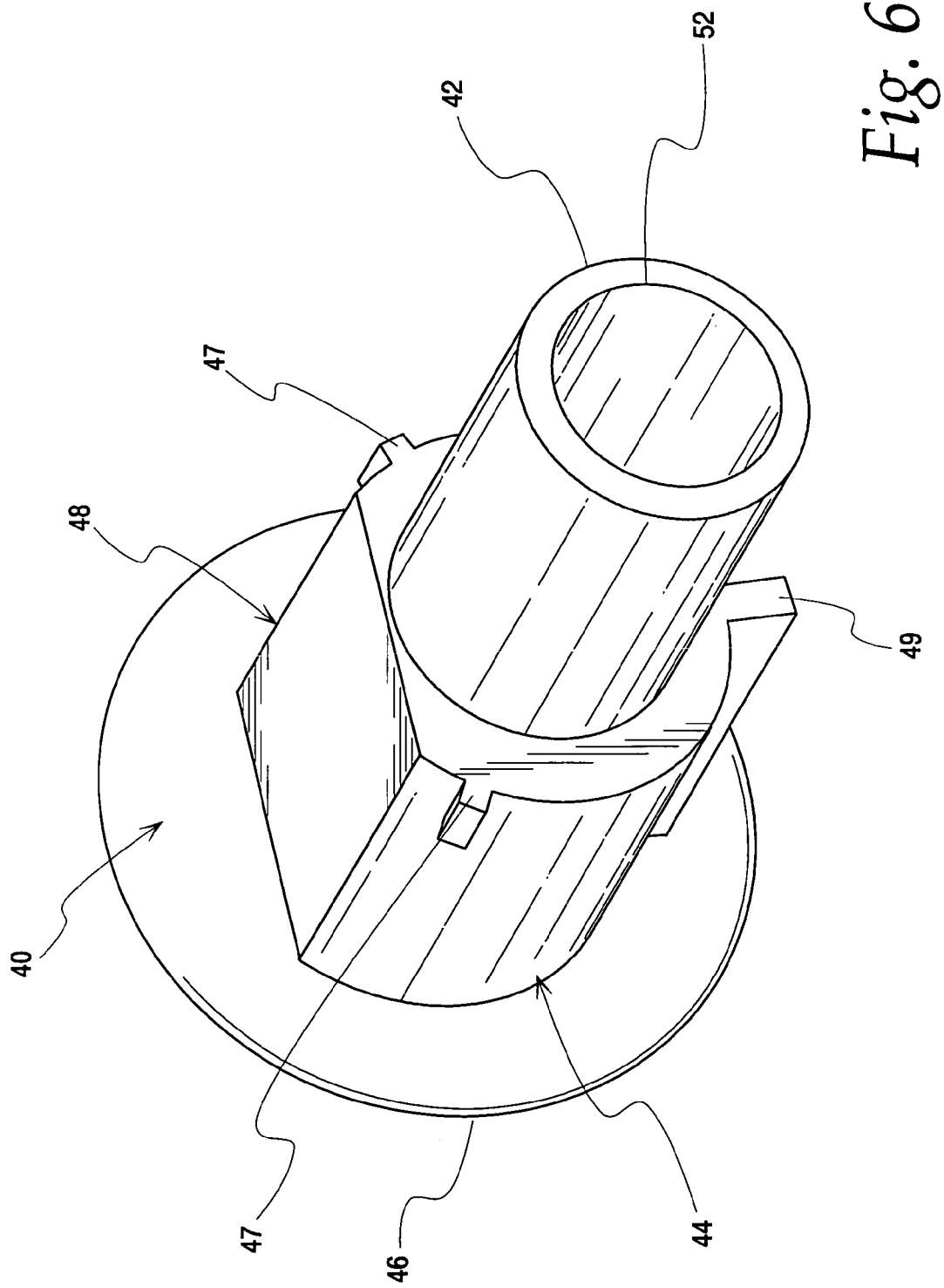
FIG. 6 is a perspective view showing an alternate embodiment of the isolation mount structure of FIG. 2.

A heat exchanger and isolation mount system 10 is shown in FIGS. 1 and 2, and includes a heat exchanger 12 in the form of a radiator for a vehicular application, such as a car or truck, a pair of side frame members 14 and 16 for mounting the heat exchanger to a vehicle, and four pairs 18 of isolation mount assemblies 19 (best seen in FIG. 2) for mounting the heat exchanger 12 to the side frame members 14,16.

The heat exchanger 12 includes a core assembly 20 and a pair of manifolds 22 and 24 connected on opposite sides 25 and 26 of the core assembly 20 to direct the working fluid, in this case coolant, to and from interior flow paths of the core 20 in heat exchange relation with a second fluid, typically air, flowing through exterior flow paths of the core 20. The core 20 can be of any conventional construction, and will typically include a plurality of flattened tubes (not shown) with serpentine or plate fins extending between the tubes (not shown). Each of the manifolds 22, 24 preferably include a header plate 27 for sealingly receiving the ends of the tubes of the core 20 and a tank 28 sealed to the header plate for directing the working fluid to and from the interiors of the tubes. The tanks 28 are preferably of a molded construction made from suitable non-metallic material, such as a suitable plastic material, but can in some applications be a cast construction made from a suitable metal. As described to this point, the construction of the heat exchanger 12 is conventional and known.

As best seen in FIGS. 1 and 2, each of the tanks 28 has a pair of spaced mount bores 30 extending along an axis 31, with each of the mount bores having opposite ends 32 and 34 extending through the tank 28. In this regard, each of the bores 30 is preferably surrounded by a boss 36 that is a unitary part of the tank 28 and which hydraulically isolate the bores 30 from the fluid containing interior 38 of the tank 28 and provides structural support for the mount assemblies 19 and associated components. It should be understood that each of the tanks may need to be strengthened in comparison to conventional tank constructions because the tanks 28 are acting essentially as load bearing frame members for the system 10. In this regard, unitary ribs 39 can be provided on the tanks 28 to provide enhanced strength.

As best seen in FIG. 2, each pair 18 of the mount assemblies 19 is inserted into the opposite ends 32,34 of a corresponding one of the mount bores 30. Each of the mount assemblies 19 includes a resilient, annular flanged isolator 40 and an annular flanged, cylindrical metal sleeve 42 extending through the isolator 40. Each of the isolators 40 has a body 44 inserted into the corresponding opposite end 32, 34, and an annular flange 46 extending from the body 44 to engage against the surface 36 of the corresponding tank 28. Preferably, the body 44 has a cylindrical shape that generally conforms to the cylindrical shape of the corresponding bore 36. In this regard, it may be desirable for each of the isolators 40 to include one or more angularly spaced ribs 47 on the exterior of the body 44 that extend parallel to the longitudinal axis 31 of the bore 30, as best seen in FIG. 6. FIG. 6 also shows a further modification wherein material has been removed from the cylindrical body 44, as shown at flat 48, to allow for easier compression of the isolator 40 in one direction, such as in the direction shown by arrows A in FIGS. 1 and 3 to accommodate, for example, thermal growth of the heat exchanger 12 in comparison to the frame members 14 and 16. In this regard, a keyway 49 is provided on the body 44 to engage in a corresponding keyway (not shown) in the corresponding bore 30 so as to correctly orient the flat 46 in the isolator 40 relative to the heat exchanger 12. Each of the sleeves 42 has a flanged end 50 engaged against the corresponding isolator 40 to limit the insertion depth of the sleeve 42 into the isolator 40, and a terminal end 52 extending from the isolator 40 into the corresponding mount bore 30 to abut the terminal end 52 of the sleeve 42 of the other mount assembly 19 of the pair 18 (which is inserted into the other of the opposite ends 32,34 of the mount bore 36). Preferably, each of the isolators 40 is molded to the exterior of the sleeve 42 to form an integral assembly, and is molded from a suitable resilient, shock absorbing material, such as a suitable rubber, and in one preferred embodiment has a durometer of 70.

As best seen in FIGS. 1 and 3, the pair of side frame members 14,16 overlie opposite sides of the core 20, with each frame member 14,16 extending between the pair of manifolds 22 and 24. As best seen in FIGS. 1 and 3-5, each of the side frame members 14,16 is preferably provided in the form of an elongated channel 60 having a base wall 62 with a pair of side walls 64 extending towards the core from each side of the base wall 62. One or more brackets 66, or other suitable structure, is provided on each of the frame members 14, 16 for attaching the frame members 14, 16 and the system 10 to the structure of the vehicle. Optionally, one or more cross braces 68 can be provided extending between the side frame members 14, 16 and overlying a face 69 of the core 20, as best seen in FIG. 3, to enhance the strength of the system 10. Each of the frame members 14, 16 includes two pairs 70 of mount flanges 72 and 74 located at opposite ends of the frame member 14,16. As best seen in FIG. 2, each pair 70 of mount flanges 72 and 74 sandwiches one of the pairs 18 of mount assemblies 19 and one of the tanks 28, and includes a fastener receiving opening 76 extending through the corresponding flange 72,74 and aligned with the axis or centerline 31 of the corresponding bore 30. Preferably, the opening is smaller than the corresponding flanged end 50 of the corresponding mount assembly 19 so that the corresponding flange 72,74 abuts the flanged end 50. While as shown it is preferred that the flanges 72, 74 be a unitary part of a corresponding side wall 64 of the channel 60, it should be understood that in some applications it may be desirable for the flanges 72,74 to be provided in another form, separate from the side walls 64.

As best seen in FIGS. 1 and 2, four threaded fasteners 80 are provided in the form of threaded bolt and nut pairs 82,84. Each of the fasteners 80 extends through one of the pairs 70 of mount flanges 72,74 and through the corresponding pair 18 of mount assemblies 19 to clamp the corresponding pair 18 of mount assemblies 19 and the corresponding tank 28 between the pair 70 of mount flanges 72 and 74, with the mount flanges 72 and 74 engaged against the flanged ends 50 of the corresponding pair 18 of mount assemblies 19 and the clamping force reacted primarily through the sleeves 42 via their abutted ends 52 so as not to overstress the isolators 46.

It should be appreciated that by integrating the pairs 18 of mount assemblies 19 into the structure of the tanks 28, the system 10 provides a compact structure for the mounting the heat exchanger 12 to a vehicle and can eliminate the need for a four piece frame that surrounds the periphery of the heat exchanger 12, thereby potentially reducing both cost and weight.

The invention claimed is:

1. A heat exchanger and isolation mount system comprising:
    a heat exchanger comprising a core and a pair of manifolds connected to opposites side of the core to direct a fluid to and from the core; each of the manifolds having a pair of spaced mount bores, each of the mount bores having opposite ends extending through the manifold;
    four pairs of isolating mount assemblies, each pair of the mount assemblies inserted into the opposite ends of a corresponding one of the mount bores, each of the mount assemblies comprising:
    a resilient, annular flanged isolator having an annular flange engaged against the corresponding manifold and a body inserted into one of the opposite ends of the corresponding mount bore, and
    an annular flanged metal sleeve extending through the isolator and having a flanged end engaged against the isolator and a terminal end extending from the isolator into the corresponding mount bore to abut the terminal end of the metal sleeve of the other mount assembly of the pair inserted into the other of the opposite ends of the corresponding mount bore;

a pair of side frame members overlying opposite sides of the core, each frame member extending between the pair of manifolds and having a pair of mount flanges sandwiching one of the pairs of mount assemblies in one of the manifolds and another pair of mount flanges sandwiching another one of the pairs of the mount assemblies in the other of the manifolds; and four threaded fasteners, each of the fasteners extending through one of the pairs of mount flanges and through the corresponding pair of mount assemblies to clamp the corresponding pair of mount assemblies and the corresponding manifold between the pair of mount flanges with the mount flanges engaged against the flanged ends of the corresponding pair of mount assemblies.

2. The heat exchanger and isolation mount system of claim 1 wherein each of the side frame members comprises an elongate channel having a base wall and a pair of side walls extending from the base wall.

3. The heat exchanger and isolation mount system of claim 2 wherein each of the mount flanges is part of a corresponding one of the side walls.

4. The heat exchanger and isolation mount system of claim 1 wherein each of the threaded fasteners comprises a threaded bolt and a threaded nut.

5. The heat exchanger and isolation mount system of claim 1 further comprising at least one cross brace extending between the side frame members and overlying a face of the core.

6. The heat exchanger and isolation mount system of claim 1 wherein each of the manifolds comprises a header plate connected to the core and a tank connected to the header plate.

7. The heat exchanger and isolation mount system of claim 1 wherein the body of the isolator has a cylindrical outer surface.

8. A heat exchanger and isolation mount system comprising:

a heat exchanger comprising a core and a pair of manifolds connected to opposites side of the core to direct a fluid to and from the core; each of the manifolds comprising a header plate and a tank having a pair of spaced mount bores, each of the mount bores having opposite ends extending through the tank;

four pairs of isolating mount assemblies, each pair of the mount assemblies inserted into the opposite ends of a corresponding one of the mount bores, each of the mount assemblies comprising:

a resilient, annular flanged isolator having an annular flange engaged against the corresponding tank and a body inserted into one of the opposite ends of the corresponding mount bore, and an annular flanged metal sleeve extending through the isolator and having a flanged end engaged against the isolator and a terminal end extending from the isolator into the corresponding mount bore to abut the terminal end of the metal sleeve of the other mount assembly of the pair inserted into the other of the opposite ends of the corresponding mount bore;

a pair of side frame members overlying opposite sides of the core, each frame member extending between the pair of manifolds and having a pair of mount flanges sandwiching one of the pairs of mount assemblies in one of the tanks and another pair of mount flanges sandwiching another one of the pairs of the mount assemblies in the other of the tanks; and four threaded fasteners, each of the fasteners extending through one of the pairs of mount flanges and through the corresponding pair of mount assemblies to clamp the corresponding pair of mount assemblies and the corresponding tank between the pair of mount flanges with the mount flanges engaged against the flanged ends of the corresponding pair of mount assemblies.

9. The heat exchanger and isolation mount system of claim 8 wherein each of the side frame members comprises an elongate channel having a base wall and a pair of side walls extending from the base wall.

10. The heat exchanger and isolation mount system of claim 9 wherein each of the mount flanges is part of a corresponding one of the side walls.

11. The heat exchanger and isolation mount system of claim 9 wherein each of the threaded fasteners comprises a threaded bolt and a threaded nut.

12. The heat exchanger and isolation mount system of claim 9 further comprising at least one cross brace extending between the side frame members and overlying a face of the core.

13. The heat exchanger and isolation mount system of claim 9 wherein each of the tanks is a molded non-metallic part.

14. The heat exchanger and isolation mount system of claim 13 wherein each of the mount bores is hydraulically isolated from fluid compartment of the tank.

15. The heat exchanger and isolation mount system of claim 8 wherein the body of the isolator has a cylindrical outer surface.

* * * * *